Dec. 30, 1958   V. M. PANARITI   2,866,442
PRESSURE MOTOR WITH PISTON CUSHIONING AND SPEED CONTROL MEANS
Filed Aug. 26, 1954
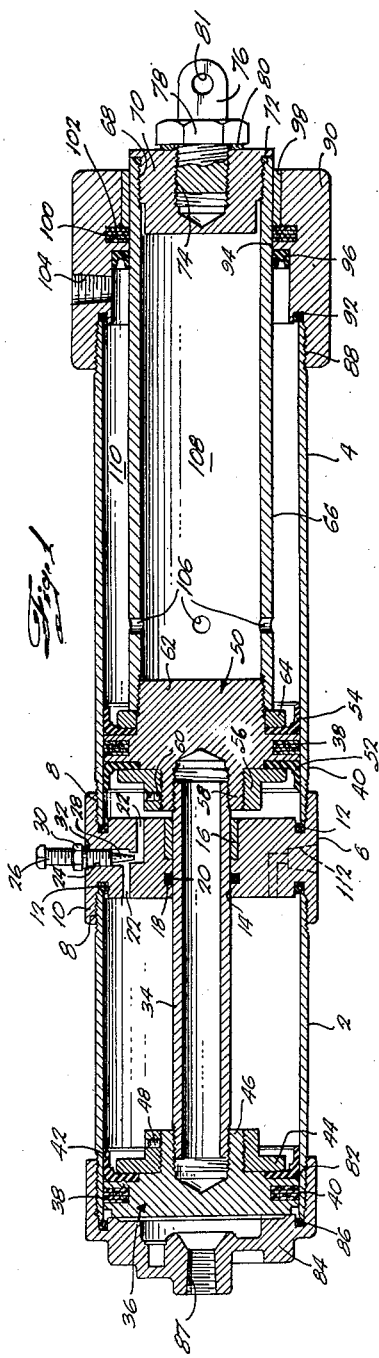
INVENTOR.
VIKTOR M. PANARITI
BY
James and Franklin
ATTORNEYS.

United States Patent Office 2,866,442
Patented Dec. 30, 1958

2,866,442

PRESSURE MOTOR WITH PISTON CUSHIONING AND SPEED CONTROL MEANS

Viktor M. Panariti, Boston, Mass., assignor to National Pneumatic Co., Inc., Boston, Mass., a corporation of Delaware Application August 26, 1954, Serial No. 452,343

7 Claims. (Cl. 121—44)

The present invention relates to a pressure motor, and more particularly to one so constructed that, by means of a simple and dependable arrangement, the speed of operation thereof in both directions is controlled and the latter part of its movement in either direction is cushioned.

The use of fluid pressure motors to provide the force for moving various objects, such as doors and the like, is well known. Such motors have been designed to operate in a variety of ways, but the so-called "differential" type motor has achieved widespread acceptance where power operation in two directions is required, as is usually the case in connection with door operating systems. In this type of motor the opposite faces of the piston have different areas, pressure constantly being applied to that face of the piston having the smaller area and pressure, usually of the same magnitude, being applied to or released from the other piston face in order to cause the piston to move in one direction or the other.

In differential type motors as well as in other motors, means must be provided for cushioning the movement of the piston at least during the last portion of its travel in both directions so that the structural member moved thereby, such as a door or the like, will not be slammed to its terminal position. Various expedients have been proposed to accomplish this end, most of them involving fairly complex structure and most requiring separate structure for cushioning the motion of the piston in each direction.

Another problem involved in the operation of equipment of this type is that its speed of operation must often be controlled throughout its range of travel. For example, such a motor might be required to develop sufficient force to close the door against exceptional resistance to movement, but it still should not be permitted to move the door too rapidly when that resistance is not present. Here again various arrangements have been proposed in the past, all of which are characterized by an appreciable degree of complexity and most of which are independent of the actual cushioning means, the latter becoming active only at the terminal portion of the stroke of the motor. In addition, separate speed control means usually must be provided for movement of the pistons in each direction.

When motors of the differential type are employed, and when pressure is applied to the large area side of the piston, the fluid on the small pressure side of the piston is often compressed, thus increasing its effective pressure, which is sometimes relied upon at least in part to check the movement of the piston. This is not particularly advantageous, in part because the development of pressures sufficiently high to be effective to check the movement of the piston in this manner requires constructing the motor so as to be capable of containing those pressures, and this adds greatly to the expense involved. Moreover, the development of a high pressure for checking purposes will result in movement of the piston away from its checked position at an excessively high speed when pressure on the large area face is released, thus making this arrangement unsuitable for such applications such as door operation.

According to the present invention a pressure motor operated at moderate pressures and of extremely simplified construction can nevertheless provide for effective checking of the piston movement at the end of its travel in both directions, the same structure being effective in each direction. This same structure also functions, throughout the range of travel of the pistons, to limit the speed at which the pistons can move, so that there will not be too great a difference between their speeds of operation when the device moved thereby offers exceptional resistance to the movement and when that device tends to move more normally. When the structure of the present invention is incorporated into a fluid pressure motor of the differential type, a novel and simplified structure is employed by means of which the pressure on the small side of the piston changes only inappreciably during movement of the piston, thus providing for uniformity of operation and permitting the structure of the motor to be simplified.

The motor of the present invention comprises a cylinder within which a pair of pistons are slidable, the pistons being connected by a piston rod. A partition is provided in the cylinder between the pistons and through which the piston rod sealingly slides. A passage of throttling size is provided through that partition. Hence whenever the pistons and piston rod move, one piston will move toward the partition and the other piston will move away therefrom. The fluid between the pistons, which preferably is compressible, will therefore have to pass through the passage in the partition. Since that passage is of throttling size, it will exert an appreciable resistance to the passage of the fluid therethrough. The faster the pistons move, the more will the pressure build up between the partition and the piston moving theretoward, and that pressure will tend to oppose the pressure exerted on the piston and hence will retard its movement. Thus the speed of the motion of the piston at any point in its travel is limited and controlled. The closer the piston approaches the partition, that is to say, the closer the piston approaches its terminal position, the more will the pressure build up between the piston and the partition for a given rate of movement of the piston. Hence, as is usually desirable, the piston will be permitted fairly rapid movement during most of its travel but will be greatly slowed down or cushioned during the end of its travel. When the pistons and piston rod move in the opposite direction, the same effect will occur and, it is to be emphasized, by means of the self-same partition and passage. Thus a single simple structural element provides for speed control of the piston-piston rod combination in both directions throughout its range of movement, with a particularly effective cushioning being produced to the end of its travel in each direction.

When a differential type motor is employed, a second piston rod is secured to the outer surface of that piston having the smaller effective area, this second piston rod sealingly passing through an end of the cylinder. The second piston rod is provided with a hollow portion the volume of which is appreciable in comparison to the space between the second piston rod and the interior of the cylinder, with which space the hollow portion is in fluid communication. Since the volume of this hollow piston rod portion remains constant no matter what the position of the piston within the cylinder, and since it is in fluid communication with the space of variable volume between the second piston rod and the interior of a cylinder, it will be apparent that the total volume of the fluid exerting pressure on the small piston will vary, when the small piston is moved toward the cylinder end through which the second piston rod extends, to a much smaller extent than if the second piston rod had not been hollow. As a result, the pressure exerted on the small piston will be much more uniform over the range of movement of the piston than would otherwise be the case.

To the accomplishment of the above, and to such other objects as may hereinafter appear, the present invention relates to the construction of a fluid pressure motor and of various parts thereof, as defined in the appended claims and as described in this specification, taken together with the accompanying drawings in which:

Fig. 1 is a cross sectional view of a preferred embodiment of the present invention showing the pistons and piston rods in one extreme position of movement; and Fig. 2 is a view similar to Fig. 1 but showing the movable parts in their other extreme position.

The motor of the present invention comprises a pair of cylinder sections 2 and 4 mounted on opposite sides of intermediate cap 6, ends 8 of the cylinder sections 2 and 4 being externally threaded and screwed into internally threaded rims 10 on the intermediate cap 6, gaskets 12 being engaged thereby so as to define a seal. The intermediate cap 6 is provided with a central circular passage 14 lined at least in part with a sleeve 16 of composition bearing material and having a groove 18 on its inner surface within which a ring 20 of sealing material is adapted to be received.

The intermediate cap 6 is provided with a second passage 22 from one side to the other thereof, an internally threaded radial opening 24 extending from the outer surface of the cap 6 to and communicating with the passage 22. An externally threaded adjusting needle 26 is threadedly received in the opening 24, the tapered tip 28 thereof cooperating with a portion of the passage 22 so that the effective size of that passage can be varied by screwing the needle 26 into or out of the opening 24, the degree of throttling exerted by the passage 22 thereby being controllable. A nut 30 and a gasket 32 are received around the needle 26 so as to seal the opening 24.

A piston rod 34 of uniformly circular cross-section is slidable through the central passage 14 of the intermediate cap 6 in sealing relation with that passage. A piston 36 is secured to the left hand end of the piston rod 34, that piston being slidable within the cylinder section 2. Absorbent material 38 is received within a circumferential channel 40 in the piston 36, the material 38 being adapted to be saturated with lubricating fluid. A rubber cup 42 is secured on the piston 36 by means of follower plate 44 threaded over the externally threaded piston hub portion 46 and secured in place by means of set screw 48. The rubber cup 42 sealingly engages the inner surface of the cylinder section 2, and the outer surface of the absorbent material 38 slides over that inner surface, all as is conventional.

A second piston 50 is secured to the other end of the piston rod 34 within the cylinder section 4, that piston 50 also having absorbent material 38 received within a circumferential groove 40 and adapted to be saturated by lubricating fluid. A pair of oppositely oriented rubber cups 52 and 54 are positioned on opposite sides of the piston 50, the cup 52 being held in place by follower plate 56 threadedly received on piston hub 58 and held in place by means of set screw 60, in a manner similar to the rubber cup 42 on the piston 36. The externally threaded hub 62 on the opposite side of the piston 50 from the hub 56, that piston side directed away from the intermediate cap 6, has a considerably greater diameter than the hub 56. A follower plate 64 is received thereover in order to retain the rubber cup 54 in position, and a hollow tubular piston rod 66 is screwed onto the hub 62, engages the follower plate 64, and holds it and the rubber cup 54 in place. The outer end of the tubular piston rod 56 is internally threaded, at 68, and a closure plug 70 is screwed thereinto, a gasket 72 being compressed between them for sealing purposes. The plug 70 is provided with an internally threaded central aperture 74 into which a plunger 76 is screwed, that plunger being held in place by means of lock nut 78 and lock washer 80. The plunger 76 is adapted to be connected to whatever external linkage is to be actuated by the motor by means of the eye 81 therein.

The left hand end 82 of the cylinder section 2 is externally threaded and is closed by means of an end cap 84 screwed thereon, a gasket 86 being compressed therebetween for sealing purposes. The end cap 84 has a passage 87 therethrough adapted to receive a fitting in an external fluid pressure system, the fluid traversing passage 86 so that its pressure may be applied to the left hand surface of the piston 36.

The right hand end 88 of the cylinder section 4 is externally threaded, and an end cap 90 is screwed thereon, a gasket 92 being compressed therebetween for sealing purposes. The end cap 90 is provided with a central passage 94 through which the hollow piston rod 66 is sealingly slidable, a linear rubber cup 96 being compressed between the piston rod 66 and the end cap 90 for sealing purposes, a tubular bearing 98 of suitable material lining at least a portion of the central passage 94, and absorbent material 100 being received within groove 102, engaging the outer surface of the piston rod 66 and being adapted to be saturated with lubricating material. In addition, the end cap 90 is provided with passage 104 adapted to receive a fitting in an external fluid pressure system and through which the fluid can pass so as to exert a pressure on the right hand side of the second piston 50.

The tubular piston rod 66 is provided with a plurality of apertures 106 adjacent the piston 50, so that the hollow interior 108 thereof is in fluid communication with the space 110 between the piston rod 66 and the inner surface of the cylinder section 4.

The fluid pressure motor as here described and illustrated is, it will be seen, of the differential type. Pressure applied through the passage 87 in the end cap 84 will be exerted against the entire left hand face of the piston 36. Pressure applied through the passage 104 in the end cap 90 will only be effective against that ring-like area on the right hand side of the piston 50 between the piston rod 66 and the cylinder section 4. Pressure will also be exerted within the piston rod 66 against the exposed surface of the hub 62, but that pressure will be balanced by the equal and opposite pressure exerted against the inner surface of the closure plug 70. Thus the effective area of the piston 50 is considerably less than the effective area of the piston 36. When pressure is applied to both of these pistons, the pressures being of substantially the same magnitude, as is customary, the force exerted on the piston 36 tending to move it to the right will be much greater than the force exerted on the piston 50 tending to move it to the left. Since the pistons are connected by the piston rod 34 the piston rod-piston assembly will move to the right. When pressure is released from the piston 36, the pressure exerted on the piston 50 tending to move it to the left will become effective and the piston rod-piston assembly will move to the left.

The space between the pistons 36 and 50 is sealed, and consequently will be of constant volume. This space is adapted to be filled with a fluid, preferably a compressible fluid such as air, which may be at atmospheric pressure or which may be at some pressure in excess of atmospheric. As indicated by the broken lines 112 in Fig. 1, a passageway may be provided through the intermediate cap 6 from the exterior thereof so that the space between the pistons 36 and 50 may be filled with a fluid, and so that the pressure of that fluid may be maintained at a minimal value above atmospheric when that is desired.

To understand the mode of operation of the motor of the present invention, let us assume that the piston-piston rod assembly has moved somewhat to the right from the position shown in Fig. 1. This will cause a contraction of the space between the piston 36 and the intermediate cap 6, and a corresponding expansion of the space between the piston 50 and the intermediate cap 6. Pressure on the left hand side of the intermediate cap 6 will thus increase while the pressure on the right hand side thereof will decrease. This pressure will tend to equalize itself through the passage 22, and the setting of the needle 26 will determine the rate at which this equalization can take place. The increase in pressure between the intermediate cap 6 and the piston 36 will slow down the movement of the piston rod-piston assembly by opposing the pressure exerted on the left hand face of the piston 36, and the decrease in pressure between the intermediate cap 6 and the piston 50 will cause the pressure exerted on the right hand side of the face of the piston 50 to be more effective in slowing down movement of the piston rod-piston assembly than would otherwise be the case.

At the beginning of the movement of the piston rod-piston assembly of the right to the position shown in Fig. 1, a given rate of movement thereof will cause the pressure to build up to the left of the intermediate cap 6 at a given rate. As the piston 36 moves farther to the right, its movement at the same speed would cause the pressure to the left of the intermediate cap 6 to build up at an increased rate, because of the lesser volume of fluid between the piston 36 and the intermediate cap 6. When the piston 36 has almost reached its limiting position shown in Fig. 2, even a slight movement thereof to the right will cause the pressure to build up between it and the intermediate cap 6 at a very high rate, because of the low volume of fluid in that space. Hence, the speed of movement of the piston rod-piston combination will be limited throughout its range of movement by the passage 22 and the needle 26, but in a non-constant and smoothly varying manner, the piston rod-piston assembly being permitted a fairly rapid rate of movement at the beginning and a progressively decreased rate of movement throughout its travel, with a very strong cushioning effect being exerted at the far end of its movement.

When pressure is released from the left hand side of the piston 36, the pressure exerted on the right hand side of the piston 50 will tend to cause the piston rod-piston assembly to move to the left from the position shown in Fig. 2 to the position shown in Fig. 1. The self-same passage 22 and needle 26 will control and limit the speed of movement of the piston rod-piston assembly to the left, and in the same way as has just been described with respect to movement to the right, relatively rapid movement being permitted at the beginning of travel, the permitted rate of movement decreasing throughout the travel, and a very strong effective cushioning effect being exerted at the very end of travel.

Attention is now directed to what takes place to the right hand side of the piston 50 when that piston is moved to the right from its position shown in Fig. 1 to the position shown in Fig. 2. A constant pressure is usually applied through the passage 104 in the end cap 90, the external fluid pressure system usually including a check valve so that the fluid contents of the cylinder section 4 are replenished only when the pressure therein falls below a predetermined value, as through leakage of the fluid therefrom. It will be noted that the diameter of the piston rod 66 is a major proportion of the diameter of the piston 50. It will further be noted that the volume of the space 108 is considerably greater than the volume of the space 110. As will be apparent from a comparison of Figs. 1 and 2, when the piston 50 has been moved to the right the volume of the space 110' in Fig. 2 is greatly lessened when compared to the space 110 in Fig. 1, and as shown in somewhat less than half the volume of the space 110. If this were the only space within which the fluid exerting pressure on the right hand face of the piston 50 were trapped, the pressure within that space would have more than doubled. This would involve constructing the motor so that it would be capable of containing that higher pressure and, when the pressure on the left hand face of the piston 36 is released, such a high pressure exerted on the right hand face of the piston 50 would tend to cause the piston rod-piston assembly to move to the left at an excessive speed.

However, because the space 108 inside the piston rod 66 is in fluid communication with the space 110 by means of the apertures 106, because the volume of the space 108 is large in comparison with that of the space 110, and because the volume of the space 108 remains constant independently of the position of the piston 50, the actual increase in pressure exerted on the right hand face of the piston 50 as between its positions of Figs. 1 and 2 will be minimal. Hence, the structure of the motor may remain simple and movement of the piston rod-piston assembly to the left when pressure on the left hand face of the piston 36 is released will proceed at an accepted speed. The relationship between the volumes of the spaces 108 and 110 may be varied in accordance with design and operating requirements.

It will be understood that a non-compressible fluid could be utilized between the pistons 36 and 50, but in that case the mode of operation of the motor would be somewhat different. The passage 22 and the needle 26 would still function as a speed-limiting device throughout the travel of the piston rod-piston assembly in both directions, but because of the incompressible nature of the fluid forced therethrough by the movement of the piston 36 or 50 theretoward, the speed control would be substantially uniform throughout the travel of the piston rod-piston assembly, with no extra cushioning effect being provided at the end of the stroke. This would be satisfactory for many applications, but when the device in question is used to move doors and the like, where it is very undesirable that the moved devices should be slammed into their final positions but where the initial movements thereof may be at higher rates of speed than their final movements, the use of a compressible fluid for the purposes described is preferred.

The motor of the present invention, it will be apparent, may be readily asembled from a minimal number of simple parts easily and inexpensively manufactured on a quantity production basis with satisfactory dimensional tolerances. The piston rods may be uniformly cylindrical, with no throttling grooves or other structural modifications which add expense to manufacture. No moving parts other than the piston rod-piston assembly are required, nor are any valves required, to produce speed control and cushioning, and the same structure provides for those results in both directions. The cooperation of the various parts is such as to produce optimum operation in a differential type motor.

The fluid in the constant pressure side of the motor here specifically disclosed is adapted to be trapped, but the checking and cushioning arrangement could be employed in motors of different types. Conversely, the arrangement employed to prevent an excessive rise in the pressure of the trapped fluid active on the "small" piston could be used in motors differing in other respects from that here disclosed.

While but a single embodiment of the present invention has been here disclosed, it will be apparent that many variations may be made therein, all within the scope of the instant invention as defined in the following claims.

I claim:

1. A pressure motor comprising a cylinder having a partition intermediate its length, a piston rod slidable through said partition in sealing relation therewith, pistons on said piston rod, one on each side of said partition, means for applying pressure to the outer surface of said pistons so as to cause said pistons and said piston rod to move in one direction or the other, and said partition having a passage of throttling size therethrough, thereby producing a speed-control effect for movement of said pistons and said piston rod in both directions, the effective outer surfaces of said pistons having different areas, means for constantly applying fluid pressure to the outer surfaces of that piston having the smaller effective outer surface, and means for alternately applying and releasing fluid pressure against the outer surface of the other piston so as to cause said pistons and said piston rod to move in one direction or the other, a part of said piston rod extending beyond the outer surface of that piston having the smaller outer surface and out through a closed end of said cylinder in sealing relation therewith, said extending piston rod part having a hollow portion of appreciable volume in fluid communication only with the interior of said cylinder and in free fluid communication therewith.

2. The pressure motor of claim 1, in which the volume of said hollow piston rod portion is greater than the maximum volume of the space between said cylinder and said extending piston rod part.

3. A fluid pressure motor comprising a pair of cylinders, one on each side of an intermediate cap, end caps closing the outer ends of said cylinders respectively, said end caps having passages through which fluid pressure may be applied within said cylinders, a first piston rod with pistons on each end, said intermediate cap having a first passage through which said first piston rod is sealingly slidable, said pistons being slidable respectively within said cylinders, said intermediate cap having a second passage of throttling size from one side to the other thereof, a second piston rod secured to one of said pistons and extending out therefrom in a direction opposite to said first piston rod, the corresponding one of said end caps having a passage through which said second piston rod is sealingly slidable, said second piston rod having a hollow portion in fluid communication only with the interior of the cylinder through which said second piston rod extends and in free fluid communication therewith, said hollow portion having a volume appreciable with respect to the maximum volume of the space between said cylinder and said piston rod.

4. The fluid pressure motor of claim 3, in which the volume of said hollow piston rod portion is greater than the maximum volume of the space between said cylinder and said piston rod.

5. The fluid pressure motor of claim 3, in which said piston rod is tubular, closed at both ends, and provided with apertures adjacent said piston defining the fluid communication between the interior of said piston rod and the space between said rod and the interior of said cylinder.

6. A pressure motor comprising a cylinder, a piston assembly within said cylinder and slidable therethrough, a piston rod connected to said piston assembly and extending therefrom out through a closed end of said cylinder in sealing relation therewith, means for constantly applying fluid pressure to the surface of said piston from which said piston rod extends, and means for alternately applying and releasing fluid pressure against the other operative surface of said piston assembly, said piston rod having a hollow portion of appreciable volume in fluid communication only with the interior of that portion of said cylinder through which said piston rod extends and in free fluid communication therewith.

7. The fluid pressure motor of claim 6, in which the volume of said hollow piston rod is greater than the maximum volume of the space between said piston rod and that portion of said cylinder through which said piston rod extends.

References Cited in the file of this patent

UNITED STATES PATENTS

| | | |
|---|---|---|
| 404,472 | Dunn | June 4, 1889 |
| 537,273 | Carlman | Apr. 9, 1895 |
| 840,876 | Steedman | Jan. 8, 1907 |
| 2,699,102 | Doyle et al. | Jan. 11, 1955 |

FOREIGN PATENTS

| | | |
|---|---|---|
| 231,253 | Great Britain | Apr. 2, 1925 |
| 412,756 | Great Britain | July 5, 1934 |
| 485,617 | Great Britain | May 16, 1938 |
| 764,509 | France | Mar. 5, 1934 |
| 892,316 | France | Jan. 7, 1944 |
| 47,774 | France | Apr. 6, 1937 |